(12) United States Patent
Kim et al.

(10) Patent No.: US 9,358,948 B2
(45) Date of Patent: Jun. 7, 2016

(54) BUCKLE DEVICE FOR SEAT BELT OF VEHICLE

(71) Applicants: Hyundai Motor Company, Seoul (KR); Samsong Industries, Ltd., Seoul (KR)

(72) Inventors: Sang Mun Kim, Whasung-Si (KR); Chang Hee Kim, Whasung-Si (KR)

(73) Assignees: Hyundai Motor Company, Seoul (KR); Samsong Industries, Ltd., Seoul (KR)

( * ) Notice: Subject to any disclaimer, the term of this patent is extended or adjusted under 35 U.S.C. 154(b) by 10 days.

(21) Appl. No.: 14/322,706

(22) Filed: Jul. 2, 2014

(65) Prior Publication Data

US 2015/0136919 A1    May 21, 2015

(30) Foreign Application Priority Data

Nov. 19, 2013    (KR) .................. 10-2013-0140406

(51) Int. Cl.
| | |
|---|---|
| *B60R 22/00* | (2006.01) |
| *B60R 22/48* | (2006.01) |
| *B60R 22/22* | (2006.01) |
| *B60R 22/26* | (2006.01) |
| *B60N 2/06* | (2006.01) |
| *B60R 22/18* | (2006.01) |

(52) U.S. Cl.
CPC . *B60R 22/22* (2013.01); *B60N 2/06* (2013.01); *B60R 22/26* (2013.01); *B60R 2022/1806* (2013.01)

(58) Field of Classification Search
USPC .............. 248/548, 201, 499, 500, 503, 503.1, 248/505, 510, 900; 24/265 BC, 265 H; 280/801.1, 808; 297/468, 469, 470, 297/471, 472
See application file for complete search history.

(56) References Cited

U.S. PATENT DOCUMENTS

| | | | | | |
|---|---|---|---|---|---|
| 2,831,228 | A | * | 4/1958 | Schwartzman | .................. 24/335 |
| 2,908,522 | A | * | 10/1959 | Glave | .............................. 292/288 |
| 2,991,524 | A | * | 7/1961 | Dobrikin | ......................... 24/371 |
| 3,957,304 | A | * | 5/1976 | Koutsky | ............... B60N 2/4249 |
| | | | | | 248/393 |
| 4,373,830 | A | * | 2/1983 | Ikesue | ........................... 403/284 |
| 4,611,854 | A | * | 9/1986 | Pfeiffer | ........................ 297/468 |
| 5,113,981 | A | * | 5/1992 | Lantz | ............................. 188/371 |
| 5,159,729 | A | * | 11/1992 | Walker | ........................ 24/68 CD |
| 5,188,425 | A | * | 2/1993 | Foster et al. | ................... 297/473 |
| 5,236,220 | A | * | 8/1993 | Mills | ........................... 280/801.1 |
| 5,492,368 | A | * | 2/1996 | Pywell | ................ B60R 22/1952 |
| | | | | | 180/282 |
| 6,209,915 | B1 | * | 4/2001 | Blakesley | .................. 280/801.1 |
| 6,312,057 | B1 | * | 11/2001 | Feile | ............................. 297/471 |
| 7,188,868 | B2 | * | 3/2007 | Yamaguchi | ................... 280/806 |

(Continued)

FOREIGN PATENT DOCUMENTS

| | | |
|---|---|---|
| JP | 06-107054 A | 4/1994 |
| KR | 100756957 B1 | 9/2007 |

(Continued)

*Primary Examiner* — Terrell McKinnon
*Assistant Examiner* — Michael McDuffie
(74) *Attorney, Agent, or Firm* — Morgan, Lewis & Bockius LLP (57) ABSTRACT

Provided is a buckle device that fixes a seat belt mounted on a 2nd-row seat or a 3rd-row seat to the vehicle body floor in a vehicle. The buckle device may include a buckle bracket having an upper end with a hole for connecting with a seat belt and a lower end connected to a rail on a vehicle body floor by a buckle connection bolt, and a wire fixing bracket connected between a side of the buckle bracket and a side of a seat frame and absorbing vibration of a seat.

4 Claims, 9 Drawing Sheets

(56) References Cited

U.S. PATENT DOCUMENTS

| | | | |
|---|---|---|---|
| 7,458,636 B2* | 12/2008 | Chen et al. | 297/250.1 |
| 7,914,045 B2* | 3/2011 | Messner et al. | 280/801.1 |
| 8,851,522 B1* | 10/2014 | Srugis et al. | 280/801.1 |
| 8,973,884 B1* | 3/2015 | Stuckey et al. | 248/503.1 |
| 9,174,566 B1* | 11/2015 | Moore | B60Q 1/00 |
| 2003/0227204 A1* | 12/2003 | Akaike | B60N 2/1615 |
| | | | 297/330 |
| 2006/0017275 A1* | 1/2006 | Sanchez | B60R 22/18 |
| | | | 280/801.1 |
| 2006/0055227 A1* | 3/2006 | Canteleux | 297/470 |
| 2006/0279130 A1* | 12/2006 | Webber | B60R 22/1952 |
| | | | 297/469 |
| 2007/0039144 A1* | 2/2007 | Ichida et al. | 24/633 |
| 2009/0250946 A1* | 10/2009 | Buckingham et al. | 292/175 |
| 2010/0301594 A1* | 12/2010 | Hathaway | B60R 22/26 |
| | | | 280/808 |
| 2012/0112503 A1 | 5/2012 | Masutani | |
| 2012/0175937 A1* | 7/2012 | Kujawa | B60R 22/1952 |
| | | | 297/480 |

FOREIGN PATENT DOCUMENTS

| | | |
|---|---|---|
| KR | 10-2008-0084654 A | 9/2008 |
| KR | 1020110029981 A | 3/2011 |
| KR | 20-0453398 Y1 | 4/2011 |
| WO | WO 03/018374 A1 | 3/2003 |

* cited by examiner

Section view A-A

FIG.1C

<CABLE WIRE STRUCTURE>

BUCKLE DEVICE FOR SEAT BELT OF VEHICLE

CROSS-REFERENCE TO RELATED APPLICATIONS

The present application claims priority of Korean Patent Application Number 10-2013-0140406 filed on Nov. 19, 2013, the entire contents of which application are incorporated herein for all purposes by this reference.

BACKGROUND OF INVENTION

1. Field of Invention

The present invention relates to a buckle device for a seat belt of a vehicle, and more particularly to a buckle device that fixes a seat belt of a seat in the second or third row of a vehicle to the rail on a vehicle body floor.

2. Description of Related Art

In general, seat belts in a vehicle are safety devices designed for reducing the degree of injury due to inertia force by securing passengers during a vehicle collision.

Seat belts are generally mounted on the seats in vehicles and there are a 2-point seat belt capable of holding only the waist of a passenger and a 3-point seat belt holding both the chest and the waist of a passenger.

In addition, the seat belts include a retractor for winding the seat belts, an upper anchor plate drawing out and guiding the seat belts into the interior of vehicles, a buckle fixed to a side of a seat, and a tongue fixed to the buckle and enabling the seat belts to hold the waist and the chest of an occupant.

One side of the buckle is fixed to a side of a seat by a hinge and the other side of the buckle with the tongue protrudes upward from the seat.

Meanwhile, 2nd-row seats of vehicles such as a sports utility vehicle (SUV) are equipped with sliding devices that are operated to move the seats forward/backward by occupants' controls in the seat to make them more comfortable.

The buckles are also coupled to the rails to be able to automatically move, depending on the positions of occupants moving with the seats with the seat belts fastened, in order to prevent excessive tension of the seatbelts from being applied to the occupants' bodies, such as the shoulders.

Various mounting structures of those buckles are disclosed in Korean Patent Publication No. 10-2011-0029981, Korean Patent Registration No. 10-0756957, and Korean Utility Model Publication No. 20-2010-0011724 etc.

Figure 4A:
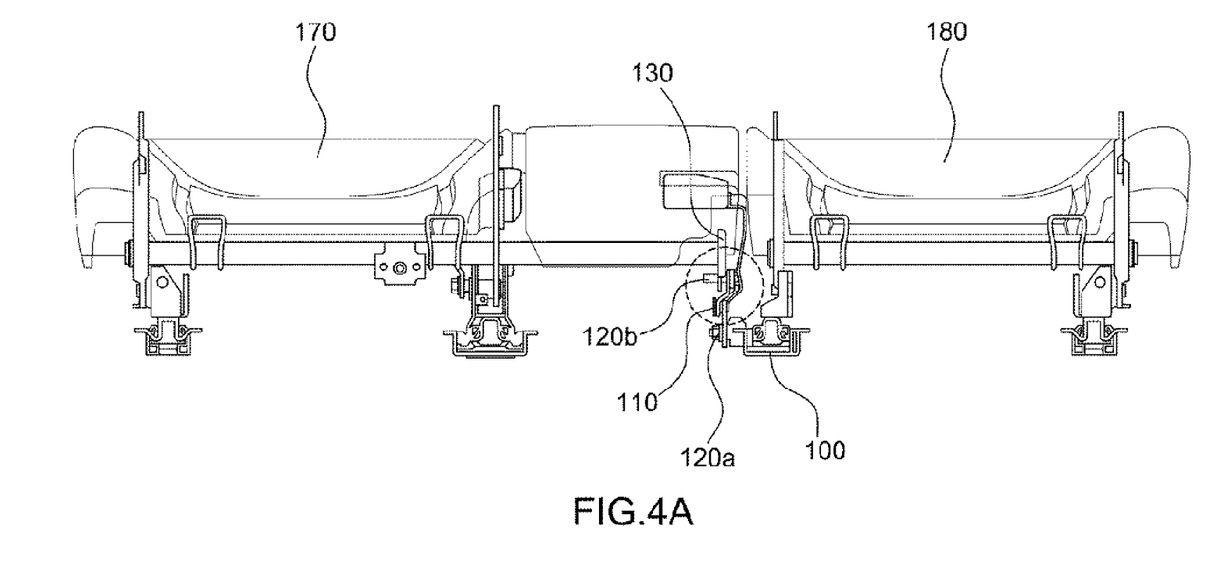
FIG. 4A, FIG. 4B and FIG. 4C show plan, front and perspective views, respectively, illustrating a 2nd-row seat composed of a 6-side seat and a 4-side seat and a buckle device of the related art.
Figure 4B:
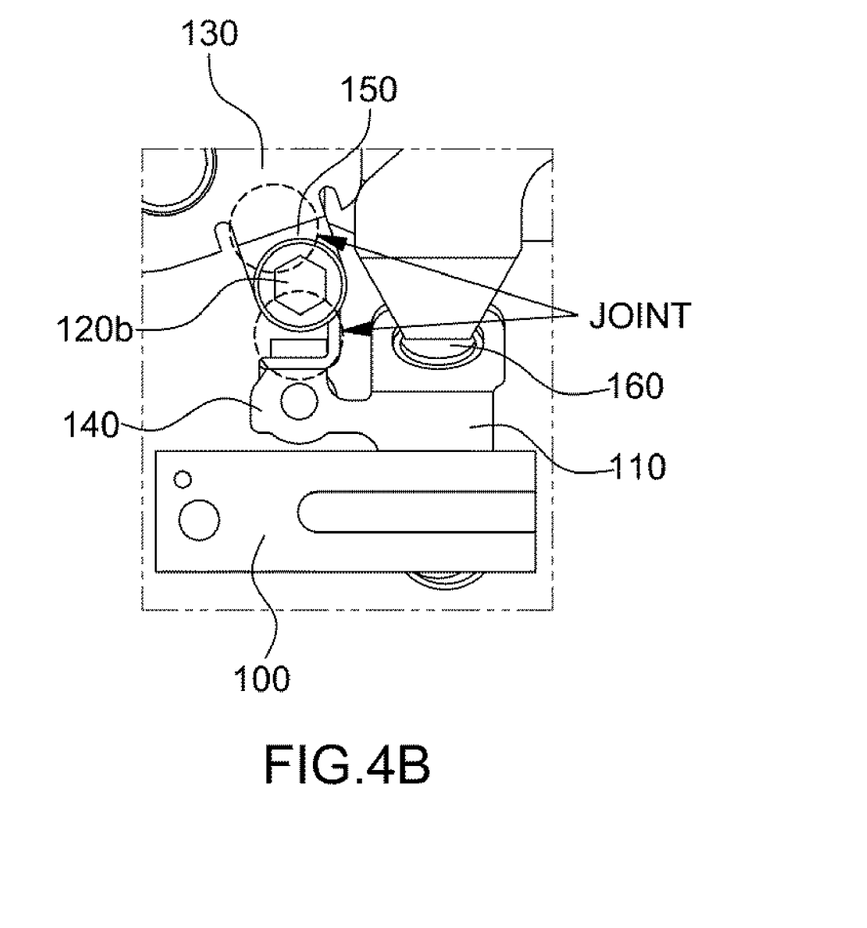
Figure 4C:
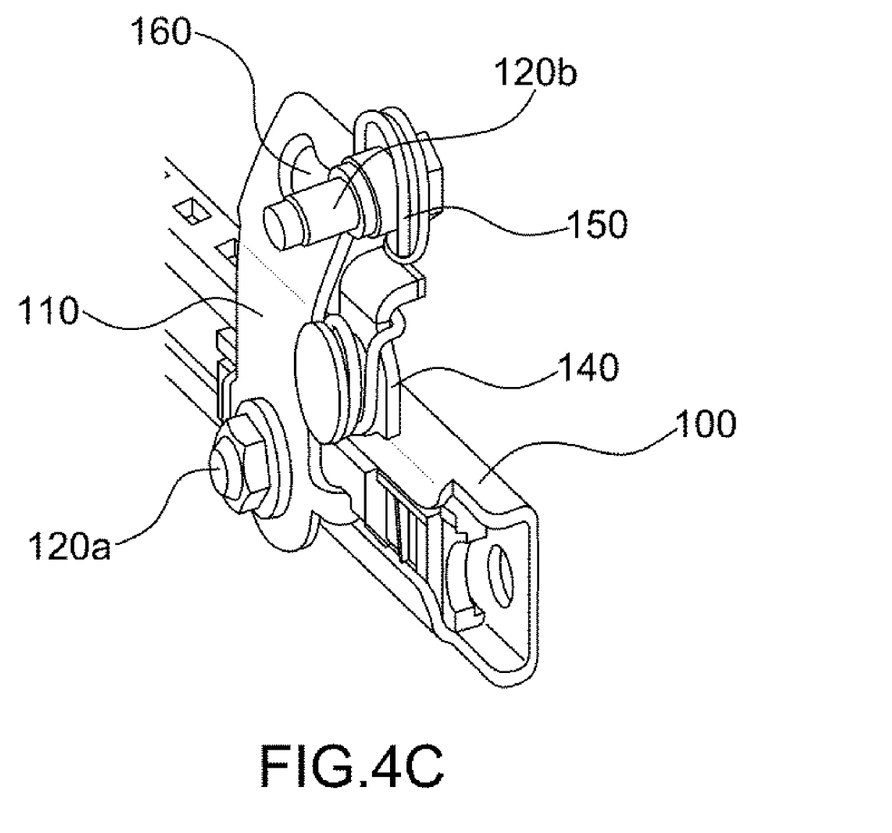

FIG. 4 shows a front view, a side view, and a perspective view illustrating a 2nd-row seat composed of a 6-side seat and a 4-side seat and a buckle device of the related art. As illustrated in FIG. 4, the seats, LH/RH seats, all have a work-in function for 3rd-row lifting and the buckles can also move with movement of the center seat (at a side of the 6-side seat).

That is, rails 100 for movement of seats are mounted on the vehicle body floor, the lower end of a buckle bracket 110 for fixing a seat belt is connected to the rail 100 by a buckle connection bolt 120*a* and the upper end is also connected to a seat connection bracket 130 by a buckle connection bolt 120*b*, and a connection wire 150 is connected between an extension 140 on a side of the buckle bracket 110 and the buckle connection bolt 120*b*. The reference numeral 160 not stated above indicates a hole formed at the upper end portion of the buckle bracket 110 to fasten a seat belt with a tongue.

However, since the buckle assembly between the 6-side seat 170 and the 4-side seat 180 in the seat structure of the related art is coupled to the seat by the connection wire, it generates a noise, when a vehicle runs on a bumpy road or passes over a projection on a road. That is, as the seat vibrates up/down, the buckle assembly of the 6-side seat shakes more than other portions, such that riding comfort is reduced and the noise is generated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made in an effort to provide a buckle device for a seat belt of a vehicle which can improve riding comfort and reduce noise while effectively absorbing vibration such as up-down vibration of a seat by having a new type of buckle structure with a cable wire connected between a seat frame and a buckle bracket for fixing a seat belt to be capable of absorbing shaking of the seat and of resisting against a load over a predetermined tensile strength.

Various aspects of the present invention provide for a buckle device for a seat belt of a vehicle that includes: a buckle bracket having an upper end with a hole for connecting with a seat belt and a lower end connected to a rail on a vehicle body floor by a buckle connection bolt, and a wire fixing bracket connected between a side of the buckle bracket and a side of a seat frame and absorbing vibration of a seat. Accordingly, the buckle device for a seat belt of a vehicle can resist a load over a predetermined tensile strength while absorbing vibration or shaking of a seat, using the wire fixing bracket.

The wire fixing bracket may include a wire member made of one or more pieces of wire, and bracket parts coupled to both ends of the wire member and fastened to the buckle bracket and the seat frame by bolt holes, respectively. The wire member and the bracket parts of the wire fixing bracket may be prevented from separating in a longitudinal direction of the wire by protrusions formed on the wire member and grooves formed on the bracket parts which are locked to each other Pressing portions that secure the wire member and the bracket parts may be formed in areas where the protrusions of the wire member and the grooves of the bracket parts are locked, and the curved hooks that are to be locked to the buckle bracket and the seat frame may be formed on the bracket parts.

The buckle device for a seat belt of a vehicle provided by the present invention includes the following advantages.

First, since the cable wire is connected between the buckle bracket with the lower end fixed to the rail and the seat frame, it is possible to appropriately absorb vibration during a seat shaking up/down, and accordingly, it is possible to improve riding comfort and reduce noise.

Second, since the cable wire made of a piece of wire or several pieces of wire is provided for connection, it is possible to resist a load over a predetermined tensile strength and keep appropriate durability in a normal state or in a collision.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A and FIG. 1B are respective perspective and front views illustrating an exemplary buckle device for a seat belt of a vehicle according to the present invention, while

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
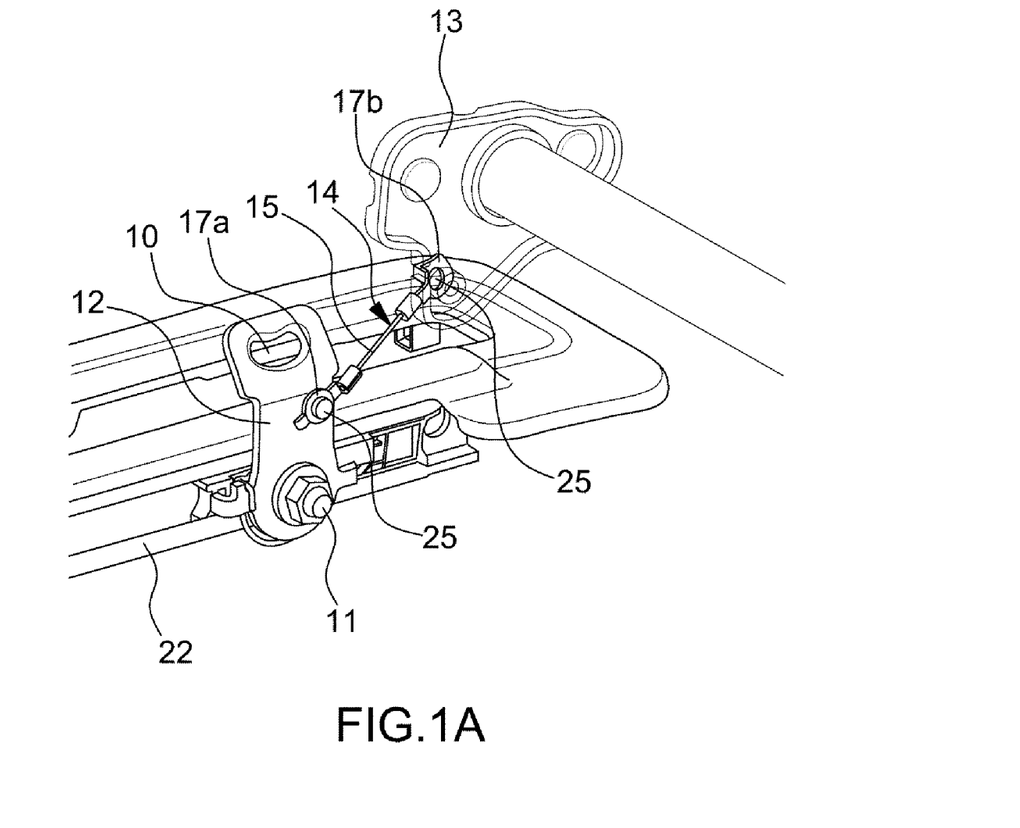
Figure 1B:
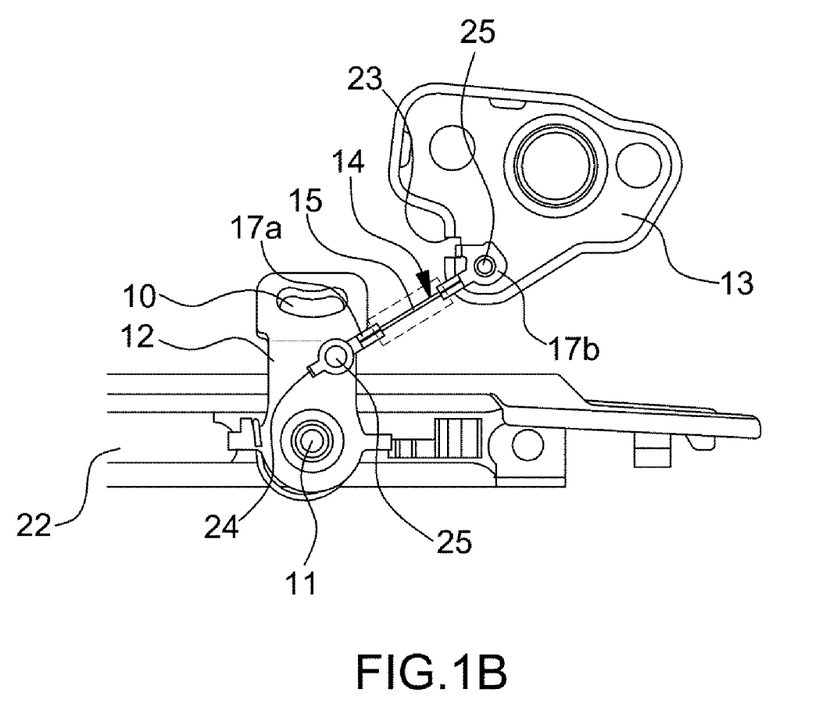
Figure 1C:
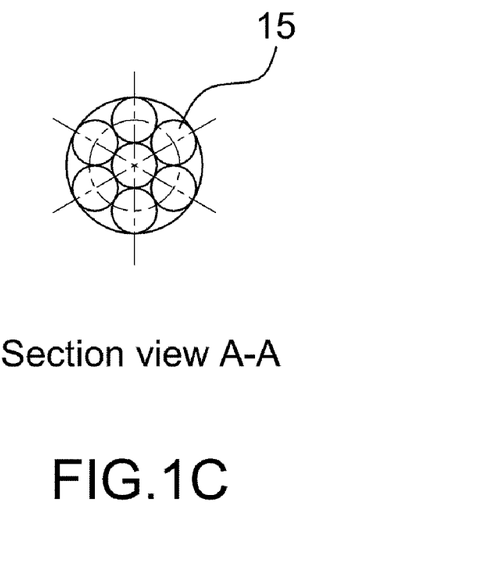
FIG. 1C and FIG. 1D are respective side and cross-sectional views of a wire member thereof.
Figure 1D:
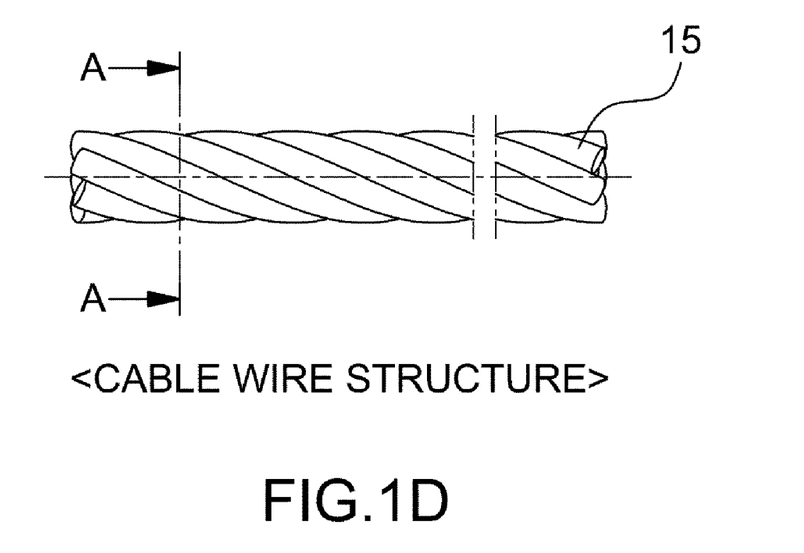
Figure 2A:
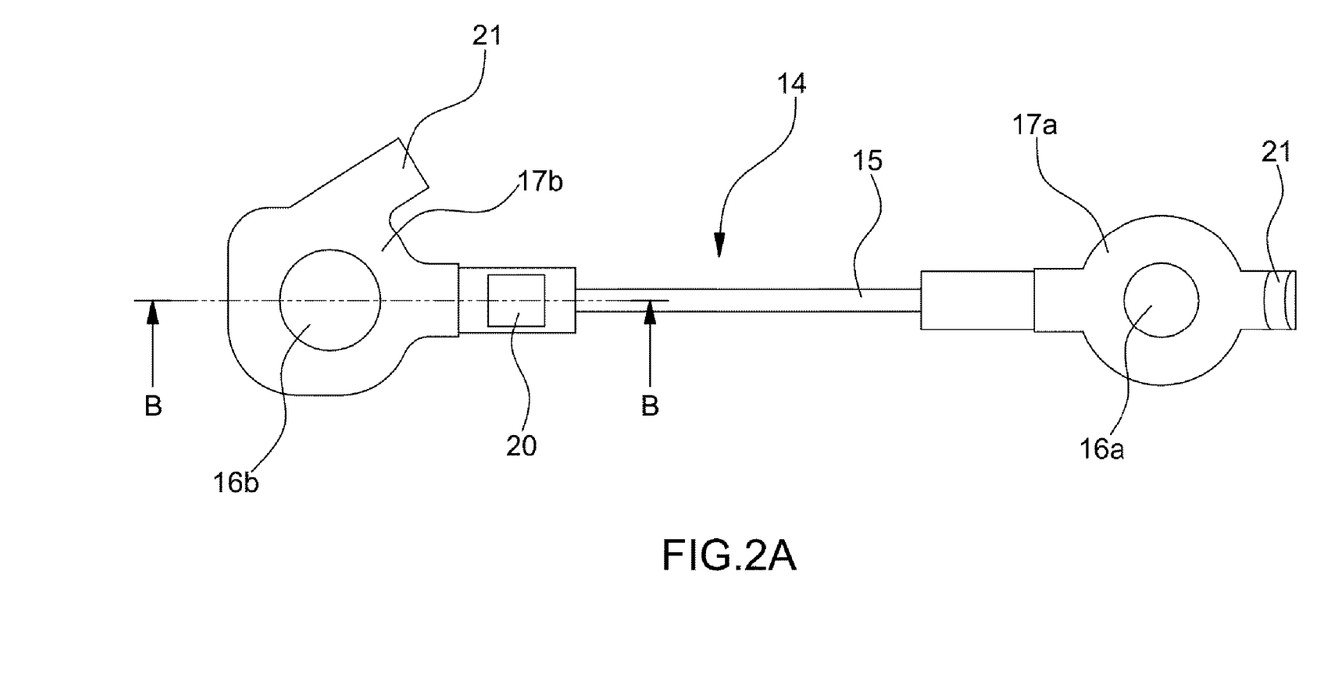
FIG. 2A and FIG. 2B are respective front and cross-sectional views illustrating an exemplary wire fixing bracket in an exemplary buckle device for a seat belt of a vehicle according to the present invention.
Figure 2B:
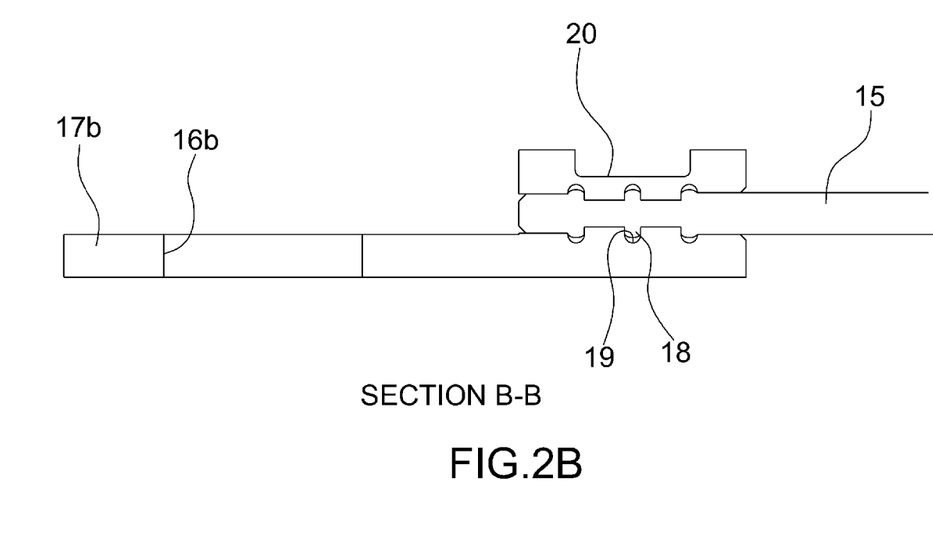

FIG. 1 is a perspective view and a front view illustrating a buckle device for a seatbelt of a vehicle according to various embodiments of the present invention and FIG. 2 is a front view and a side view illustrating a wire fixing bracket in the buckle device for a seatbelt of a vehicle according to various embodiments of the present invention.

As illustrated in FIGS. 1 and 2, the buckle device for a seat belt has a structure that can actively handle up/down vibration of a seat, in which a buckle bracket and a seat frame are connected by a cable wire structure, so it can absorb shaking of a seat and have appropriate durable rigidity. To this end, a buckle bracket 12, a member for fixing a side of a seatbelt to which a buckle is connected, is provided and the lower end of the buckle bracket 12 is supported on a rail 22 mounted on a vehicle body floor.

For example, the lower end of the buckle bracket 12 can be fastened to a lock plate (26 in FIG. 3) on the rail 22 by a buckle connection bolt 11 and supported on the rail and can move along the rail 22 with movement of a seat for adjusting the position of an occupant.

A hole 10 is formed at the upper end portion of the buckle bracket 12 and the lower end of a seatbelt with a buckle at the upper end is fastened to the hole 10. A hole for bolting is formed at a side, for example, at the middle portion of the buckle bracket 12 and a bolt 25 for fastening one end of a wire fixing bracket 14, which is described below, to the buckle bracket 12 can be fitted into the hole. In addition, a locking hole 24 is formed at the other side of the buckle bracket 12, for example, close to the hole for bolting and used to lock a curved hook 21 of the wire fixing bracket 14.

The wire fixing bracket 14 is provided as a member capable of particularly absorbing the vibrations during a seat shaking up/down. The wire fixing bracket 14 is composed of a wire member 15 made of a piece wire or several pieces of wire and two bracket parts 17a and 17b connected with the buckle bracket 12 and the seat frame 13, respectively, and is connected between a side of the buckle bracket 12 and a side of the seat frame 13.

That is, the bracket parts 17a and 17b are coupled to both ends of the wire member 15 having a predetermined length and disposed on the buckle bracket 12 and the seat frame 13, respectively, and a bolt 25 is secured to the buckle bracket 12 through a bolt hole 16a of the bracket part 17a and a bolt 25 is secured to the seat frame 13 through a bolt hole 16b of the bracket part 17b. Accordingly, the wire fixing bracket 14 can be connected at an angle between the buckle bracket 12 and the seat frame 13.

The curved hook 21 that bends at or substantially at 90° is formed on each of the bracket parts 17a and 17b of the wire fixing bracket 14, so the curved hook 21 of the bracket part 17a can be fitted and locked in the locking hole 24 formed at the buckle bracket 12 and the curved hook 21 of the other bracket part 17b can be fitted and locked in the locking hole 23 formed at the seat frame 13. Therefore, the wire fixing bracket 14 can be secured between the buckle bracket 12 and the seat frame 13 by the bolting portions and the curved hooks of the bracket parts 17a and 17b.

Further, coupling structures each composed of a hole and a protrusion are provided as a member to prevent separation (falling-out) between the wire member 15 and the bracket parts 17a and 17b. That is, a plurality of protrusions 18 is formed at the end portions of the wire member 15 and a plurality of grooves 19 is formed at the positions corresponding to the protrusions 18, on the inner sides of the pipe-shaped end portions of the bracket parts 17a and 17b.

Accordingly, the grooves 19 and the protrusions 18 are locked to each other, making structures locked in the longitudinal direction of the wire, by inserting the end portions with the protrusions 18 of the wire member 15 into the pipe-shaped end portions with the grooves 19 of the bracket parts 17a and 17b, such that the wire member 15 and the bracket parts 17a and 17b are not separated in the longitudinal direction of the wire.

Further, in order to secure the coupling structures between the wire member 15 and the bracket parts 17a and 17b, pressing portions 20 are formed where the protrusions 18 of the wire member 15 and the grooves 19 of the bracket parts 17a and 17b are locked, so they can secure the wire member 15 and the bracket parts 17a and 17b.

The connection structures of the wire member 15 and the bracket parts 17a and 17b may be integral or monolithic structures by die casting, other than the forcible-fitting structures.

Since between the buckle bracket 12 fixed to the rail 22 on a vehicle body floor and the seat frame 13 of a seat are connected by a cable wire structure, as described above, vibrations during a seat shaking up/down can be absorbed through the cable wire, and accordingly riding comfort for an occupant can be ensured and generating noise can be minimized.

Figure 3A:
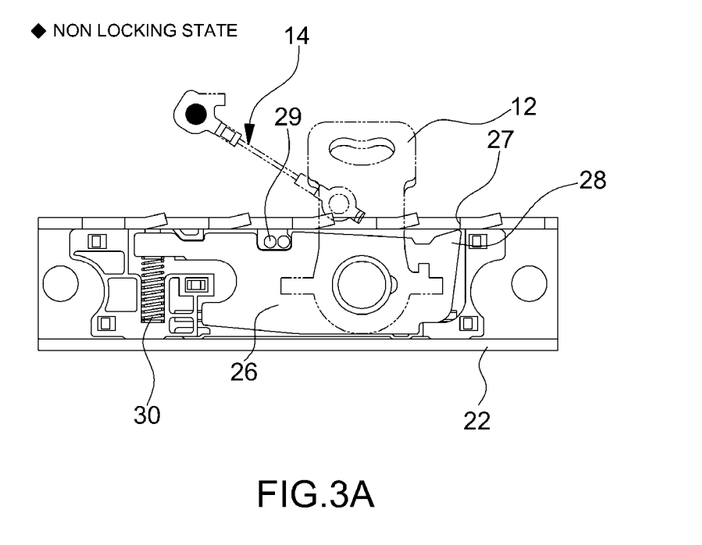
FIG. 3A and FIG. 3B are front views illustrating a state of a buckle locked and unlocked, respectively, in a normal state and in a collision, in an exemplary buckle device for a seat belt of a vehicle according to the present invention.
Figure 3B:
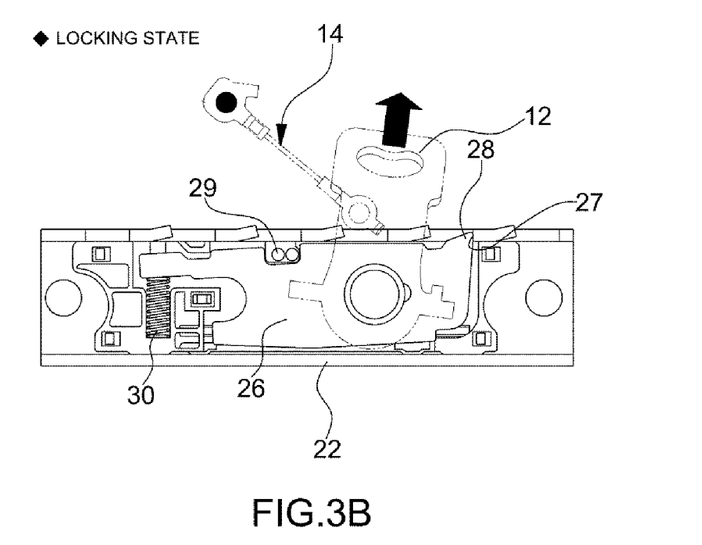

FIG. 3 is a front view illustrating a state of a buckle locked and unlocked in a normal state and in a collision, in the buckle device for a seat belt of a vehicle according to various embodiments of the present invention. FIG. 3 illustrates a structure that locks a seat belt holding an occupant in a car collision.

That is, the buckle bracket 12 is fastened and fixed to the lock plate 26 on the rail 22 by the buckle connection bolt 11, in which the lock plate 26 is disposed such that it can move along the rail 22 and pivot on a pivot point 29 on the inner side of the rail 22. Accordingly, the lock plate 26 is normally slid along the rail 22 by a return spring 30 elastically supporting one end of the lock plate 26 and allows the buckle bracket 12 to move in a normal state.

In a collision, a load is applied to the seat belt by forward movement of an occupant, the buckle bracket 12 is pulled up and the end, that is, the end connected with the buckle bracket 12, of the lock plate 26 is also lifted by the force, such that a plate protrusion 28 of the lock plate 26 is locked to the rail groove 27 of the rail 22, and consequently, the seat belt is locked and can hold the occupant's body.

The wire fixing bracket 14 connected between the buckle bracket 12 and the seat frame 13 keeps predetermined rigidity, using properties of the cable wire structure, even if a load is applied by the buckle bracket 12 pulled up, such that it can effectively prevent the buckle bracket 12 from being damaged or deformed, and as a result, it can supplement the holding force of the seatbelt.

For convenience in explanation and accurate definition in the appended claims, the terms "upper" or "lower", "up" or "down", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A buckle device for a seatbelt of a vehicle, comprising:
    a buckle bracket having an upper end with a hole for connecting with a seat belt and a lower end connected to a rail on a vehicle body floor by a buckle connection bolt; and
    a wire fixing bracket connected between a side of the buckle bracket and a side of a seat frame and absorbing vibration of a seat,
    wherein the wire fixing bracket comprises:
        a wire member including at least a piece of wire;
        a first bracket part including a first hole; and
        a second bracket part including a second hole,
            wherein the first bracket part is coupled to a first end of the wire member and the second bracket part is coupled to a second end of the wire member, and
            wherein the first bracket part is fastened to the buckle bracket through the first hole and the second bracket part is fastened to the seat frame through the second hole.

2. The buckle device of claim 1, wherein the wire member and the first and second bracket parts of the wire fixing bracket are prevented from separating in a longitudinal direction of the wire by protrusions formed on the wire member and grooves formed on the first and second bracket parts which are locked to each other.

3. The buckle device of claim 2, wherein pressing portions that secure the wire member and the first and second bracket parts are formed in areas where the protrusions of the wire member and the grooves of the first and second bracket parts are locked.

4. The buckle device of claim 1, wherein curved hooks that are to be locked to the buckle bracket and the seat frame are formed on the first and second bracket parts.

* * * * *